(12) United States Patent
Mazourenko et al.

(10) Patent No.: US 6,272,224 B1
(45) Date of Patent: Aug. 7, 2001

(54) METHOD AND APPARATUS FOR QUANTUM DISTRIBUTION OF AN ENCRYPTION KEY

(75) Inventors: Youri Mazourenko, Pouilley-les-Vignes; Jean-Marc Merolla, Nommav; Jean-Pierre Goedgebuer, Pouilley-les-Vignes, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/063,413

(22) Filed: Apr. 21, 1998

(30) Foreign Application Priority Data

May 6, 1997 (FR) .................................................. 97 05573

(51) Int. Cl.⁷ .............................. H04L 9/08; H04K 1/00
(52) U.S. Cl. ........................... 380/283; 380/44; 380/260; 380/256
(58) Field of Search .................................. 380/256, 278, 380/283, 44, 260

(56) References Cited

U.S. PATENT DOCUMENTS

| | | | |
|---|---|---|---|
| 5,243,649 | * 9/1993 | Franson | 380/256 |
| 5,307,410 | * 4/1994 | Bennett | 380/256 |
| 5,339,182 | * 8/1994 | Kimble et al. | 359/112 |
| 5,515,438 | * 5/1996 | Bennett et al. | 380/278 |
| 5,675,648 | * 10/1997 | Townsend | 380/278 |
| 5,764,765 | * 6/1998 | Phoenix et al. | 380/283 |
| 5,953,421 | * 9/1999 | Townsend | 380/283 |
| 5,966,224 | * 10/1999 | Hughes et al. | 359/112 |
| 6,028,935 | * 2/2000 | Rarity et al. | 380/256 |

FOREIGN PATENT DOCUMENTS

WO 96/06491 2/1996 (WO) .

OTHER PUBLICATIONS

Brassard, Gilles. A Bibliography of Quantum Cryptography. http://www.cs.megill.ca/~crepeau/CRYPTO/Biblio-QC.html. Sep. 2, 1994/ Jul. 22, 1998.*

D. N. Klyshko, Physics Letters A, vol. 227, No. 1–2, pp. 1–4, "Quantum Cryptography Using Multicolored or Multidirectional Photons", Mar. 10, 1997.

* cited by examiner

Primary Examiner—Gilberto Barron, Jr.
Assistant Examiner—Bryan Latham
(74) Attorney, Agent, or Firm—Oblon, Spivak, McClelland, Maier & Neustadt, P.C.

(57) ABSTRACT

Process and device for quantum distribution of an encryption key.

According to the invention, a light beam is modulated by a signal, the phase of which can be adjusted at random. On reception, the received beam is modulated by a signal, the phase of which is also adjustable. The intensity of one of the lateral modes is measured, which depends on the difference between the two phases used. The key is distributed by the photons contained in one of the lateral modes.

Application to cryptography with secret key.

11 Claims, 7 Drawing Sheets

METHOD AND APPARATUS FOR QUANTUM DISTRIBUTION OF AN ENCRYPTION KEY

BACKGROUND OF THE INVENTION

1. Field of the Invention

The purpose of this invention is a process and device for quantum distribution of an encryption key. It has applications in cryptography, in other words secret transmission of information.

2. Discussion of the Background

The invention relates to cryptography with a secret key. In this technique, a plain text message is transformed into a coded message using an algorithm with a secret key. This key is formed from a sequence of random numbers. The message sender and receiver must exchange this secret key in order to be able to correctly encrypt and decrypt the message.

If the key is as long as the message and if it is only used once, then it is impossible to decrypt the signal without the key.

The problem that occurs with this type of encryption is that the key has to be transmitted without being detectable by a third party eavesdropping on exchanges between the sender and the receiver.

Quantum key distribution or "quantum encryption" solves this problem. This technique uses some properties of quantum physics, particularly the following:

the state of an elementary particle (for example the polarization state of a photon) cannot be determined unless the measurement is made in the same base as the base that was used to prepare this state (for example, it is impossible to determine the state of a photon that was polarized circularly to the right or to the left, by measuring this state in a linear polarization base);

any measurement projects the studied system into a state specific to the base used to make this measurement; it is then no longer possible to determine the state in which the system was before the measurement if the base is not the same; thus, measuring the linear polarization of a photon prepared in a circular polarization state will result in loss of knowledge of its initial polarization state.

Figure 1:
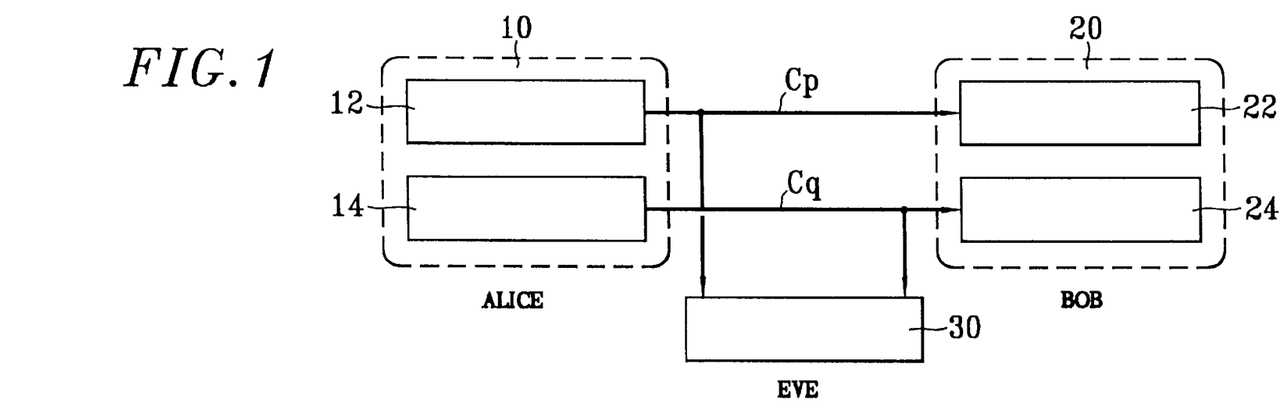
FIG. 1, already described, is a general diagram showing a device for quantum distribution of an encryption key.

FIG. 1 attached clarifies the principles of quantum key distribution to a certain extent. The sender and receiver are called Alice and Bob, according to the usual terminology in cryptography. Alice has a transmission set 10 composed of conventional transmission means 12 and quantum transmission means 14. Bob has a reception set 20 composed of conventional reception means 22 and quantum reception means 24. Alice and Bob communicate through two channels, one of which is public (Cp) and the other is quantum (Cq). Furthermore, it is assumed that a third party called Eve is eavesdropping on lines Cp and Cq.

The general process comprises the following steps:

1) Alice sends a sequence of photons to Bob on the quantum channel Cq, choosing the state in which each photon will be prepared in a random manner; each state is used to code one information bit; it is considered that the correspondence between the value of the coding bit and the state that codes it is known publicly.

2) On reception, Bob decides to measure the state of each detected photon at random, without knowing in advance the state in which it was prepared.

3) After the quantum communication, Alice and Bob discuss the results of their transmission through the public line Cp; the purpose of this discussion is to eliminate the incorrect measurements that can be explained by the quantum principles mentioned above; having done this, Alice and Bob each have a common string formed of a random sequence of bits; the presence of an eavesdropper will cause a higher error rate than would occur if there was no eavesdropper; this increase in the error rate is due to bad measurements (according to the quantum principles mentioned) made by Eve who wants to know the state of the photon sent by Alice.

4) The error rate is calculated by means of a publicly known process, and will detect the presence of the spy.

The protocols used at the present time can be classed into two groups:

the protocol with four states: Alice uses two bases not orthogonal with each other formed by two orthogonal states. Bob uses one of the two bases at random to measure the state of the photon sent by Alice. This protocol was suggested by S. J. D. PHOENIX and P. D. TOWNSEND in an article entitled "Quantum Cryptography and Secure Optical Communications" published in the "revue BT Techn. Journ.", 11, 2, PP 65–75, 1993;

the protocol with two states: Alice only uses two non-orthogonal states of a photon to code her information. This protocol is described in document U.S. Pat. No. 5,307,410.

The procedure for the latter protocol is as follows:

1) Alice sends a sequence of photons individually, choosing the type of state in which she prepares them at random (non-orthogonal states). These two states represent bits 0 and 1. The correspondence between the state and the value of the bit is known publicly.

2) On reception, Bob attempts to measure the state of the photon sent by Alice. He does this by choosing one of two measurement bases mutually orthogonal to the two states chosen by Alice, at random. Two cases may arise:

a) Bob detects nothing; this means either that there is no photon to be detected, or that the base used to make the measurement is orthogonal to the state to the transmitted photon; therefore, Bob cannot know which bit Alice sent to him.

b) The base used by Bob is not orthogonal to the state sent by Alice; there is then a non-zero probability of detecting a photon; in this case (when he detects a photon) Bob will know the state (and therefore the corresponding bit) of the photon sent by Alice, (since he knows it is the state that is not orthogonal to the base that he used).

3) To determine the state of the photons sent by Alice, Eve has to make the same type of measurements as Bob and therefore is subject to the same constraints as Bob. When she detects a photon, she knows the state of the photon sent by Alice with certainty and can send a photon to Bob in the same state (obviously she will have one chance out of two of making the right choice). When she detects nothing she cannot know if it is because she chose the wrong base or if it is because there was no photon. In this case she must either delete the transmission signal or send a photon in the state that she assumes is right and thus introduce errors between Alice and Bob.

4) Bob publicly announces that he has detected a photon (or when he has not detected it), but does not reveal the base used to make the measurement. The remaining bits must be absolutely identical if the message was not intercepted. In order to test if there was any eavesdropping on their line, Alice and Bob publicly compare parts of their key, and then sacrifice this part. The presence of Eve will be detected by the errors that she caused.

The coding used to put the photons in a certain state may be one of two types. The first type is coding by polarization. The information concerns the polarization state of the photon. This method is described by an article by G. H. BENNET, G. BRASSARD and A. EKERT entitled "Quantum Cryptography" published in the "Scientific American" 33, p. 26, 1993. It is also described in the article by C. H. BENNETT et al entitled "Experimental Quantum Cryptography" published in the "Journal of Cryptology" 5, pp 3–28, 1992. The problem with this technique is the difficulty of maintaining the polarization of photons over a long distance.

In a second type of coding, the optical phase is adjusted. The device is shown schematically in FIG. 2 attached. It comprises a single photon source 40, a symmetric Mach-Zehnder interferometer 41 comprising a phase modulator 42 specific to Alice and a phase modulator 52 specific to Bob. At the output from the interferometer there are two photon detectors 61, 62 and a decryption and counting circuit 64.

Figure 2:
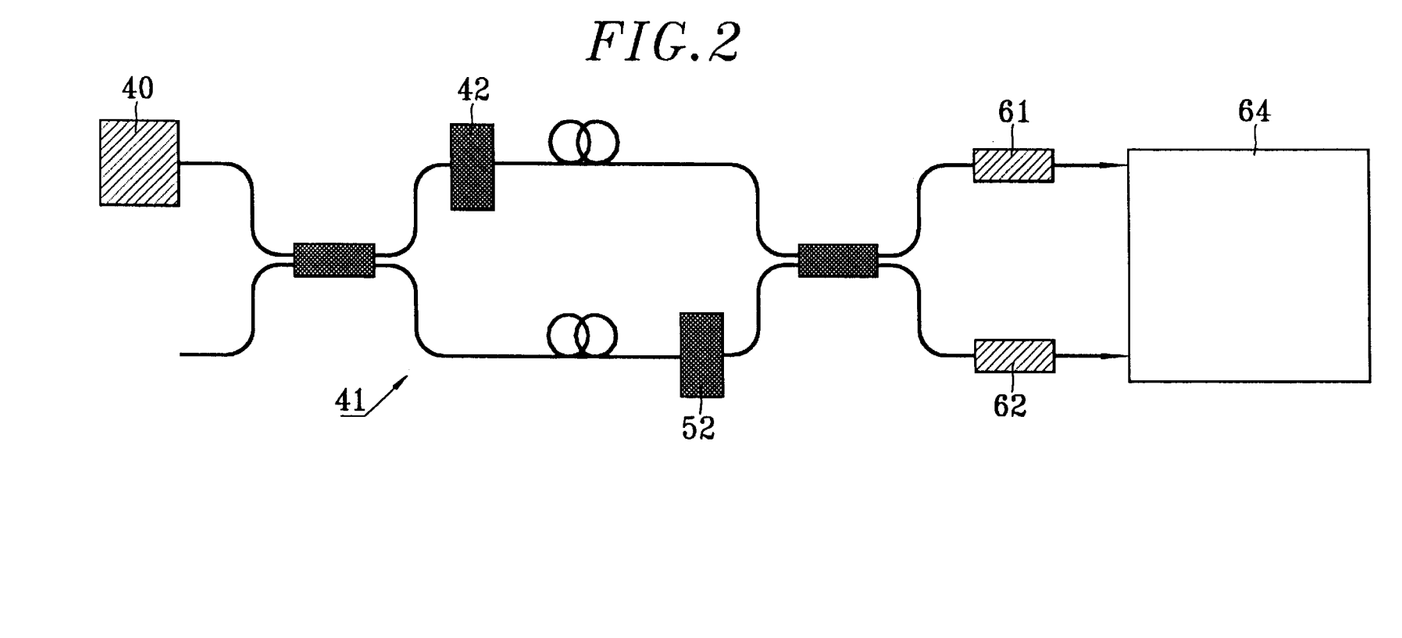
FIG. 2, already described, illustrates a quantum key distribution device using optical phase coding.

This device operates as follows: Alice and Bob input a phase difference for each photon emitted by the source 40, using modulators 42 and 52. Alice arbitrarily chooses the phase to which bits 0 and 1 correspond. Bob determines the state of the sent bit using the two detector, 61 and 62 using the second measurement protocol described above.

This solution is difficult to use over long distances (in other words for systems using optical fibers) since the same phase relation has to be kept between the two arms of the interferometer over the entire distance.

Figure 3:
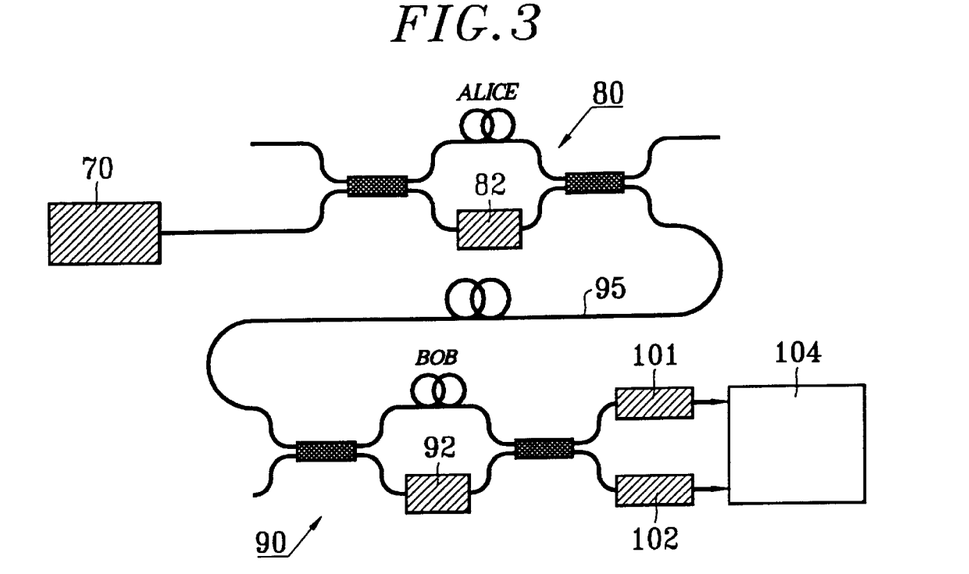
FIG. 3, already described, illustrates a quantum key distribution device over a long distance using optical phase coding.

Therefore another system is used for long distances, shown in FIG. 3. This system also uses a single photon source 70, a first Mach-Zehnder interferometer 80 used in emission, with a second phase modulator 82 specific to Alice and a second Mach-Zehnder interferometer 90 used in reception with a second phase modulator 92 specific to Bob, two single photon detectors 101, 102 and a decryption and counting means 104. The two interferometers 80, 90 are connected through a channel 95 which in practice is an optical fiber.

This device operates as follows. Each interferometer has an optical phase shifter 82, 92 on one of its arms, used to transmit the key. However, it is necessary that the signals from the two arms in the same interferometer do not interfere. Therefore these two signals have to be separated, for example either by using a delay between the two arms exceeding the source coherence length (which in this case is pulsed) or by using an acoustic-optical modulator to produce a frequency separation of the signal propagating in one of the two arms of the interferometers.

Figure 4:
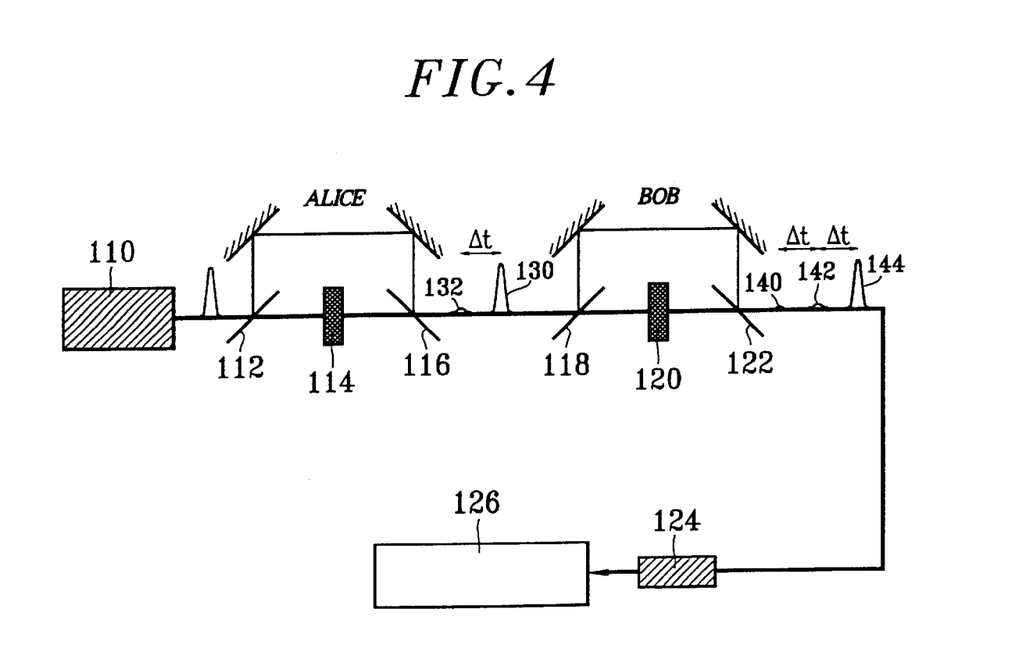
FIG. 4, already described, illustrates a quantum key distribution device for an encryption key with two non-orthogonal states.

Another possible device is the device described in patent U.S. Pat. No. 5,307,410 already mentioned. The device is shown in FIG. 4 attached. It includes a pulsed source 110, a first interferometer specific to Alice with a first semi-transparent blade 112, a first phase modulator 114 and a second semi-transparent blade 116; it also includes a second interferometer specific to Bob, with a third semi-transparent blade 118, a second phase modulator 120 and a fourth semi-transparent blade 122; the device also comprises a single photon detector 124 and finally a counting and encryption circuit 126.

The source 110 and the arm lengths are such that the light pulses are separated by an interval exceeding the length of the pulses. But unlike the previous device, the pulses propagating in the two arms of the interferometer do not have the same intensity (due to the semi-transparent blades). Thus at the output from the first interferometer, two pulses 130, 132 are observed separated by delay ΔT. The pulse 130, called the reference pulse, is the pulse with the conventional intensity. The other pulse 132, called the signal pulse, containing less than one photon on average, has been subjected to a controlled phase shift by Alice. Three pulses are observed at the output from the second interferometer. The first pulse, 140, has negligible intensity. It originates from the signal pulse that was attenuated again. The second pulse, 142, is the superposition of the first delayed (but not attenuated) signal pulse and the attenuated reference pulse phase shifted by Bob. Therefore the intensity of the second pulse 142 depends on the phase shifts introduced by Bob and Alice. This is used to transmit the encryption key. The final pulse, 144, is the part of the reference pulse that was delayed again and for which the intensity is constant. It will be used to determine if there was a spy on the line.

The devices described above all have disadvantages:

1) For coding by polarization, the technical problem is due to the difficulty of rigorously keeping the polarization through optical fibers used in telecommunication. To solve this problem, it is necessary to:

a) use fibers retailing the polarization, but this solution makes it impossible to use existing optical networks;

b) use a polarization control system; a polarized signal is sent and used to determine and correct polarization changes along the transmission line. In this case, the quantum transmission system becomes more complex and the polarization fluctuation aloner the quantum channel has to be checked regularly (and therefore the key transmission rate has to be reduced).

2) For coding by optical phase, the systems presented above have two interferometers (emitter-receiver) with relatively long arms. The difficulty is to keep the delay between the two arms constant with high precision.

The purpose of this invention is to overcome these disadvantages.

SUMMARY OF THE INVENTION

The purpose of the invention is a process for quantum distribution of an encryption key in which, in a known manner:

a sender emits a sequence of photons by choosing one of two determined states at random for each photon, each photon thus forming a code for one information bit, an addressee detects the photons by choosing one out of two determined measurement bases, at random, the addressee informs the sender which photons he detected through a public channel, without revealing which base he used, the sender and the addressee retain the bits for which photons were detected, to form the encryption key between them;

the process according to the invention is characterized by the fact that:

A) the sender:

a) generates a light beam with a given angular frequency (wo) and a given intensity, b) produces a first electrical modulation signal with a given angular frequency ($\Omega$), c) gives this first electrical modulation signal a first phase ($\emptyset_A$) chosen at random from two values, the code for each bit thus being determined by this first phase ($\emptyset_A$), d) modulates the light beam by the first electrical signal, this modulation showing up a central mode (wo) and at least two lateral modes (wo $\pm\Omega$), e) attenuates the intensity of the light beam such that the intensity of the lateral modes is sufficiently low so that there is only one photon in the lateral modes, photons associated with the information bits that will form the encryption key thus being the photons transmitted in the two lateral modes and not in the central mode, B) The addressee
  a) produces a second electrical modulation signal synchronous with the first electrical modulation signal used in the emission,
  b) gives the second electrical signal a second phase ($\emptyset_B$) chosen at random from two given values, these two values being different from the two values chosen for the first phase ($\emptyset_A$) at the time of the emission,
  c) modulates the light beam received by the second electrical signal,
  d) optically separates the received central mode and the lateral modes,
  e) in one of the lateral modes, detects the presence of a photon, this detection depending on the phase difference ($\emptyset$) between the first phase shift (($\emptyset_A$) chosen by the sender and the second phase shift ($\emptyset_B$) chosen by the addressee,
  f) informs the sender which photons he detected, through the public channel, but without revealing the values of the second phase shift ($\emptyset_B$) that he used, the sender and the addressee then use the set of bits corresponding to the detected photons, as the encryption key.

Preferably, the modulation done on the emission is an amplitude modulation, this amplitude being in the form 1+a cos ($\Omega t+\emptyset_A$) where a is the modulation ratio and $\Omega$ is the angular frequency of the modulation. In this case there are two lateral modes, which are $\Omega$ distant from the central mode. The modulation ratio is preferably chosen to be less than 0.5, for example close to 0.1.

Without going outside the scope of the invention, it would be possible to use other modulations such as a frequency modulation, the essential point being to obtain at least one lateral mode used to transmit the photons.

Preferably, the process according to the invention is complemented by verification operations designed to determine if the quantum channel was eavesdropped by a third party. This is done by the sender and the addressee sacrificing some elements of their key by publicly comparing them to determine any errors caused by the spy.

Another purpose of she invention is a device for embodiment of the process that has just been defined. This device comprises:

A) Sender end:
  a) a light source capable of generating a light beam with a given angular frequency (wo) and a given intensity,
  b) means of producing a first electrical modulation signal,
  c) means of giving this first electrical modulation signal a first phase ($\emptyset_A$) chosen at random from two determined values, the code of each bit thus being determined by this first phase ($\emptyset_A$),
  d) means of modulating the light beam by this first electrical signal, this modulation introducing a central mode (wo) and at least two lateral modes (wo $\pm\Omega$) in the modulated light beam,
  e) a light beam intensity attenuator, such that the intensity of the lateral modes is sufficiently low so that there is statistically only a single photon in the lateral modes, the photons associated with he information bits that will form the encryption key thus being the photons transmitted in the lateral modes and not in the central mode.

B) Destination end:
  a) means of producing a second electrical modulation signal synchronous with the first electrical modulation signal used in the emission,
  b) means of giving the second electrical signal a second phase ($\emptyset_B$) chosen at random from two determined values, these two values being different from the two determined values chosen at the time of the emission for the first phase ($\emptyset_A$),
  c) means of modulating the light beam received by the second electrical signal,
  d) an analyzer for optically separating the received central mode and the lateral modes,
  e) a photodetector receiving one of the lateral modes, the signal output by this photodetector depending on the phase difference ($\emptyset$) between the first phase shift ($\emptyset_A$) chosen by the sender and the second phase shift ($\emptyset_B$) chosen by the addressee,
  f) means of informing the sender which photons were detected, through a public channel, but without revealing the values of the second phase shift ($\emptyset_B$) used, and, at the sender end and the addressee end, means of selecting the set of bits corresponding to the detected photons as the encryption key.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 5:
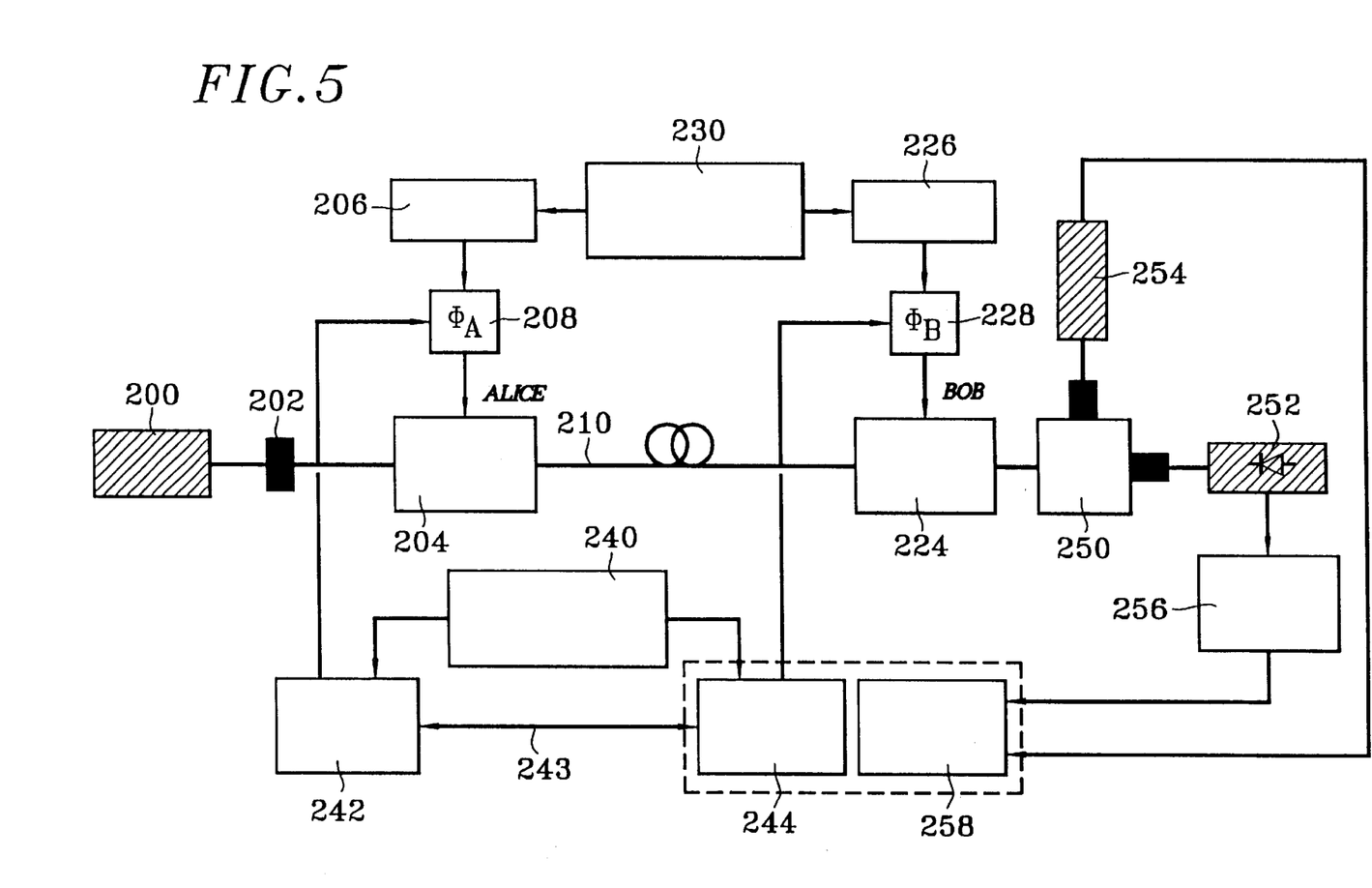
FIG. 5 shows a quantum key distribution device according to the invention.

The device shown in FIG. 5 comprises, at the emission end, a monochromatic source 200 (for example composed of a semiconductor laser like a distributed reaction laser (DFB) operating at 1 μm or at 1.5 μm), an attenuator 202, a first optical modulator 204 controlled by a carrier. The carrier being produced by a generator 206, the phase $\emptyset_A$ of this carrier being adjusted by a phase shifter 208. The modulated optical wave is transmitted on a line 210, which may be an optical fiber. This line forms the quantum channel.

At the reception end. The device comprises a second modulator 224 controlled by a carrier produced by a local generator 226, the phase $\emptyset_B$ of this carrier being adjusted by a phase shifter 228.

These various electronic means are synchronized between the transmitter and the receiver, firstly by a modulation frequency synchronization circuit 230 that controls the two local generators 206 and 226, and then by a phase shift control synchronization circuit 240 that controls a first circuit 242 controlling and memorizing the electrical phase shift $\emptyset_A$ imposed by the phase shifter 208, and a second circuit 244 checking and memorizing the electrical phase shift $\emptyset_B$ imposed by phase shifter 228. A public channel 243 is used to exchange and compare the results.

At the receiver end, the device also includes a spectral filter 250, for example of the Fabry-Pérot interferometer type, a single photon detector 252 (for example an avalanche photodiode) placed behind the spectral filter 250, a multiphotonic detector 254, for example of the photodiode type, a photon counter 255 connected to a single photon detector 252 and a circuit 258 checking and memorizing the photon count.

This device operates as follows. The light beam emitted by the source 200 is attenuated by the adjustable attenuator 202 to obtain a weak output intensity, but strong enough to be considered as conventional. This attenuated beam forms the reference beam. The reference beam is either amplitude modulated or phase modulated by modulator 204. In the simplest case, this periodic modulation is sinusoidal. It is produced by the local generator 206. The amplitude and angular frequency of the optical field at the input to modulator 204 are denoted Ao and ωo respectively. The field at the output from this modulator has been subjected to a periodic modulation with angular frequency Ω and amplitude |f| assumed to be very much less than 1 (where f is complex), its amplitude becomes:

$$A \approx Ao(1+f \cos (\Omega t))$$

Figure 6A:
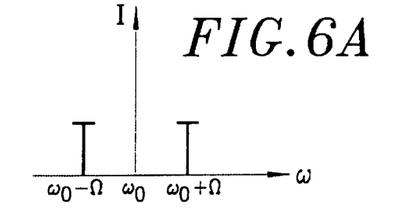
FIG. 6A shows the spectral energy density observed at the output from the first modulator and FIGS. 6B, 6C and 6D show the spectral energy density observed at the output from the second modulator as a function of the phase shift; for 6B the phase shift is 0, for 6C the phase shift is equal to $\pi$, and for 6D the phase shift is equal to $\pi/2$.

As shown in FIG. 6A, this amplitude modulation introduces two lateral modes at two lateral frequencies separated from the initial angular frequency ωo by Ω. The amplitude of these lateral modes is Aof/2. These lateral frequencies are used for quantum transmission according to the invention. The intensity of these lateral modes must be sufficiently weak so that it can be considered that there is only one photon. More accurately, it is necessary that the average time separating two photons in the same pulse must be greater than the time necessary to transmit one information bit. This is done by controlling the modulation amplitude.

The information bit is coded by introducing a phase shift $\phi_A$ in the modulation signal. This phase shift is produced by the phase shifter 208 under the control of circuit 242. The amplitude of the beam at the output from the first modulator 204 becomes:

$$A_1 \approx A_o(1+f \cos (\Omega t+\phi_A))$$

This signal is transmitted to the second modulator 224 through the optical fiber 210. This fiber forms the quantum transmission channel.

In turn, Bob uses his local generator 226 to modulate the optical signal received with the same amplitude. He personally introduces a phase $\phi_B$ using phase shifter 228. The shape of the amplitude at the output from the second modulator 224 is:

$$A \approx Ao(1+f \cos (\Omega t+\phi_A))+f \cos(\Omega t+\phi_B) \approx Ao(1+2 f \cos (\phi_A-\phi_B)/2) \cos(\Omega t+(\phi_B+\phi_A)/2)$$

Therefore, the intensity of the lateral modes depends on phases $\phi_A$ and $\phi_B$ introduced by the transmitter and the receiver:

$$I \approx 4|Aof|^2 (\cos ((\phi_A-\phi_B)/2) \cos (\Omega t+(\phi_B+\phi_A)/2))^2$$

Figure 6B:
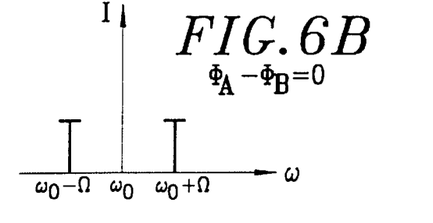
Figure 6C:
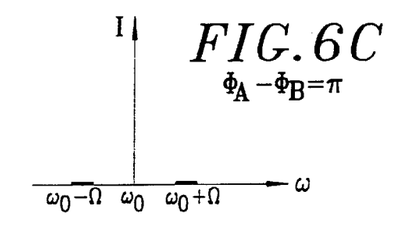
Figure 6D:
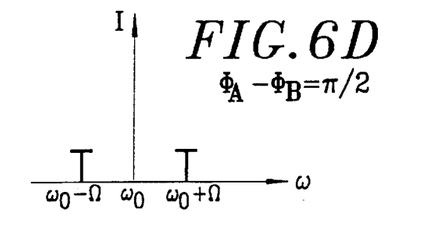

FIGS. 6B, 6C and 6D represent the intensity of the lateral modes based on the respective values of the phase shifts $\phi_A$ and $\phi_B$; FIG. 6B corresponds to the case in which $\phi_A-\phi_B=0$, FIG. 6C to the case in which $\phi_A-\phi_B=\pi$ and FIG. 6D to the case in which $\phi_A-\phi_B=\pi/2$.

If it is assumed that the detection time is very large compared with the optical angular frequency, then the average intensity Q detected is:

$$Q \approx 4Qi^2(\cos(\phi_A-\phi_B)/2)^2$$

where $Qi=|Acf|^2$

In order to detect this intensity variation, Bob uses the spectral filter 250 which separates the central mode ωo and the lateral modes (ωo ±Ω). The reference beam (ωo) is detected by the conventional photodetector 254 and is necessary to confirm the presence of the transmitted bit. The lateral mode is detected by the single photon detector 252.

Alice and Bob will use the behavior of the intensity of this lateral mode (which depends on $\phi_A-\phi_B$) to obtain a secret encryption key and to detect the presence of a spy. It can be shown that the probability of detecting a photon in one of the lateral modes is proportional to the quantity:

$$[\cos (\phi_A-\phi_B)/2]^2$$

If $\phi_A-\phi_B=\pi$, then this probability is zero. If $\phi_A-\phi_B$ is not equal to π, the probability of detecting the photon is not zero and depends on the average number of photons detected.

Therefore, the quantum transmission is done as follows:

1) Each photon transmits one information bit. Alice chooses two phase shifts at random, separated by π/2 for the modulation signal to encode bits 0 and 1. For example, the phase shifts 0 and π/2 represent bits 0 and 1 respectively.

2) Bob attempts to determine which bit was sent by Alice by varying the phase shift of his modulation signal at random, using two values. These two values are offset by π with respect to the phase shifts chosen by Alice. In the previous example, Bob uses phase shifts π and 3π/2.

3) Bob publicly informs Alice when he detects a photon, but does not reveal the phase that he used.

4) Alice and Bob eliminate all bits for which Bob did not detect anything. The remaining bits will be used to form a common encryption key.

If a spy (Eve) is present on the transmission channel, she will attempt to determine the state of the bit sent by Alice and return the same bit to Bob so that she is not detected. To do this, she uses the same procedure and the same system as Bob. To detect her presence, Alice and Bob must sacrifice a few elements of their key by publicly comparing them (to determine errors caused by Eve).

The listening technique can be summarized as follows:

a) If Eve detects a photon, then she precisely determines the state of the bit sent by Alice and sends the same bit to Bob to avoid being detected (however, remember that she has only one chance out of two of choosing the right phase shift).

b) If Eve does not detect anything, she cannot know what phase Alice used. She can use the following tactics to avoid being detected:

i) she decides to send only the reference signal so that Bob in turn detects nothing at his photon counter; however she may be discovered because in this case Bob's modulator will produce a photon in the lateral mode, even if the phase difference between Alice and Bob was π; in this case Eve changes the detection statistics and therefore introduces additional detectable errors;

ii) she deletes the signal; in this case Bob will not detect the reference signal on his conventional detector and will deduce that a spy is present;

iii) Eve sends the signal to Bob with an arbitrary phase shift; she can be detected even in this case, since she may cause errors.

Thus by publicly comparing the phases that they used (for some element, of their key) Alice and Bob can determine if someone was listening (since Bob can detect a photon even for a phase difference of π).

The following three tables summarize these various operations. Table 1 is for the key transmission protocol. Table 2 summarizes the strategy used by the key sender (Alice). Table 3 illustrates detection of the presence of a spy.

TABLE 1

| Bit sent by Alice | 0 | | | 1 | | |
|---|---|---|---|---|---|---|
| Phase used by Alice | 0 | | | π/2 | | |
| Phase used by Bob | π | 3 π/2 | π | 3 π/2 | | |
| Photon detected by Bob | no | no | yes | no | yes | no |
| Bit read by Bob | ? | ? | 0 | ? | 1 | ? |
| Detection announced by Bob | no | no | yes | no | yes | no |
| Common bit | no | no | yes | no | yes | no |

TABLE 2

| Phase used by Alice | 0 | | | | | π/2 | | | |
|---|---|---|---|---|---|---|---|---|---|
| Phase used by Eve | π | 3 π/2 | | | π | 3 π/2 | | | |
| Photon detected by Eve | no | no | yes | | no | yes | no | | |
| Phase detected by Eve | ? | ? | 0 | | ? | π/2 | ? | | |
| Phase chosen by Eve to distort the signal | 0 | π/2 | 0 | π/2 | 0 | 0 | π/2 | 3π/2 | 0 | 3π/2 |
| Detection of the spy | no | yes | no | yes | no | yes | no | no | yes | no |

TABLE 3

| Phase used by Alice | 0 | | | π/2 | | |
|---|---|---|---|---|---|---|
| Phase chosen by Eve to distort the signal | π/2 | | | 0 | | |
| Phase used by Bob | π | 3 π/2 | π | 3 π/2 | | |
| Photon detected by Bob | no | no | yes | no | yes | no |
| Detection of spy | yes | no | no | no | yes | no |

Figure 7:
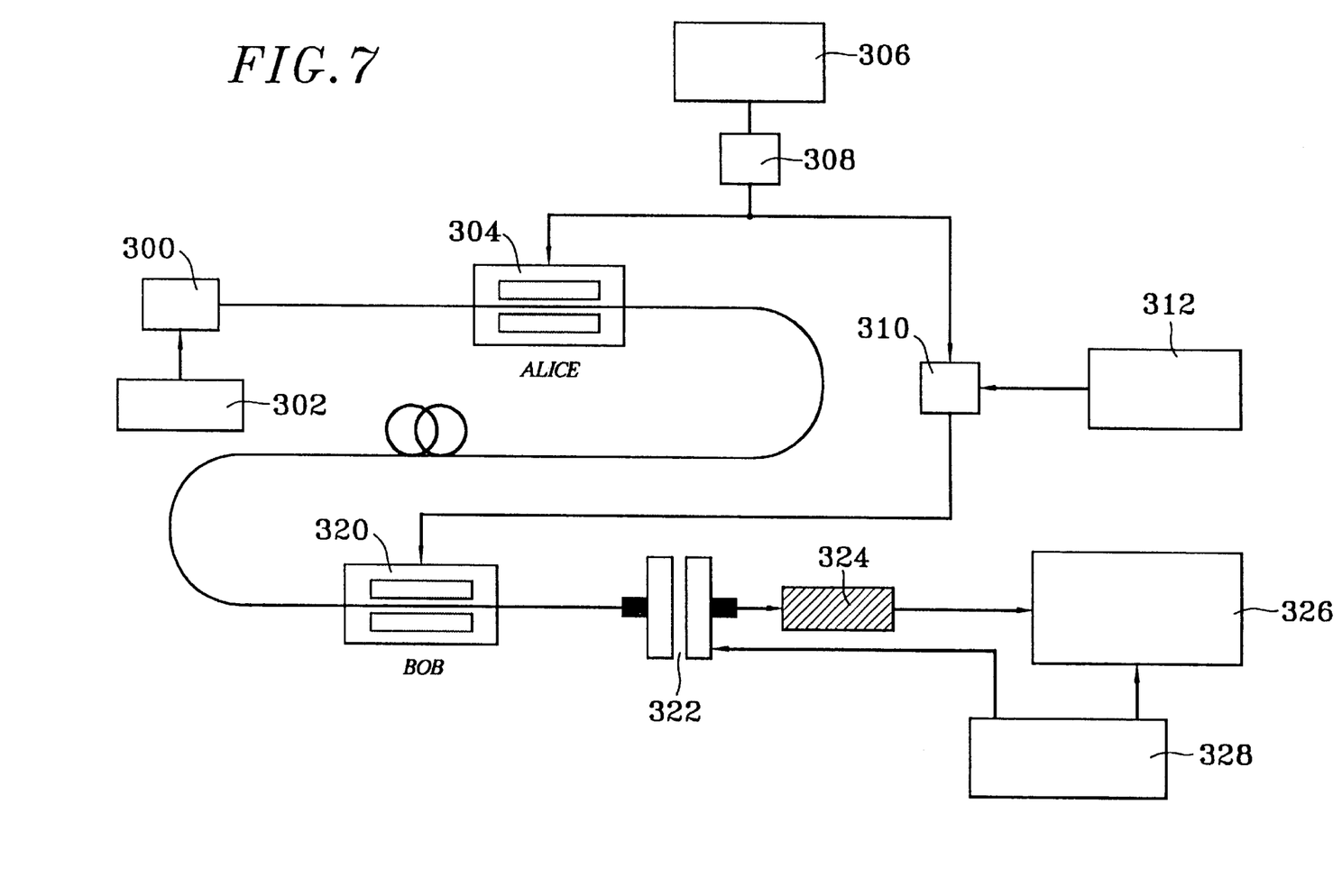
FIG. 7 illustrates a circuit to check the feasibility of the process.

In practice, a device according to the invention may be conform with the diagram in FIG. 7 which concerns a set up used to demonstrate the feasibility of the process. The device shown comprises a semiconductor laser 300 of the distributed reaction type (DFB) servocontrolled in temperature by a circuit 302. The phase modulator 304 is controlled by a generator 306, the output of which is amplified by an amplifier 308. The output from amplifier 308 is applied directly to modulator 304, but is also applied to a phase shifter 310 controlled by a circuit 312. The modulator 320 of the receiver is controlled by the phase shifter 310. Therefore the two modulators 304 and 320 work together with an adjustable phase shift φ. A Fabry-Pérot type spectrum analyzer 322 is controlled by a ramp generator 328. The analyzer 322 is followed by detector 324 connected to an oscilloscope 326.

The characteristics of the various components used may be as follows (for explanation purposes and in no way restrictive):

the DFB laser used has a spectral width of about 1 MHz and its wave length is about 1.5582 µm;

the control voltage of the modulator 304 varies from 7 V to 15 V;

the amplifier 308 is a high frequency amplifier (10 MHz to 1 GHz) and its power gain is 40 dB;

the electric phase shift between the direct channel and the Chase shifted channel is produced by the phase shifter 310 controlled in voltage (360°/12 V); it operates with an electric modulation of 300 MHz.

The Fabry-Pérot 322 is formed of two plane mirrors; it is controlled by a ramp generator that varies the position of a mirror and therefore determines the spectrum; the mirror reflection coefficient is 0.95; the mirrors are at a spacing of 15 cm in order to obtain the maximum resolution; a fineness of 60 is obtained with a resolution power $\Delta\lambda/\lambda = 1.18 \cdot 10^{-7}$, namely a width of 16 MHz; this resolution is sufficient to resolve the lateral modulation bands that appear when electro-optical modulators are used, since the modulation frequency is 300 MHz;

modulators 304 and 320 may be electro-optic phase modulators integrated on lithium niobate; these modulators has a pass-band of 500 MHz and 1 GHz respectively; the attenuation caused by the modulators is of the order of 10 dB; the modulation frequency is 300 MHz.

Figure 8:
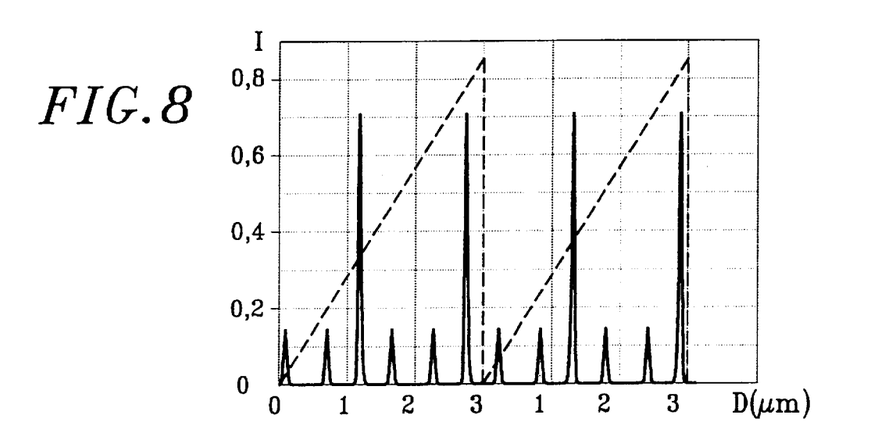
FIG. 8 shows the variations of the output signal from a spectrum analyzer composed of a Fabry-Pérot as a function of the displacement of one of its mirrors.

FIG. 8 shows the simulation of the intensity (I) at the output from the Fabry-Pérot 322 as a function of the displacement (D) of the mirrors when one of the modulators is in operation. Note that the clearcut separation between the various modes related to a modulation frequency is high compared with the spectral widths of the Fabry-Pérot transmission peaks (300 MHz and 16 MHz respectively).

It is required to use this type of device for quantum key transmission, then it is necessary to ensure that there is a maximum probability of having not more than one photon in the first lateral modulation mode and a minimum probability of having one or more photons in the other modes. Assuming that mode order 0 contains an average of thirty photons, it is necessary that the first order contains 0.1 photons on average (to give a low probability of having more than one photon in this mode).

Figure 9:
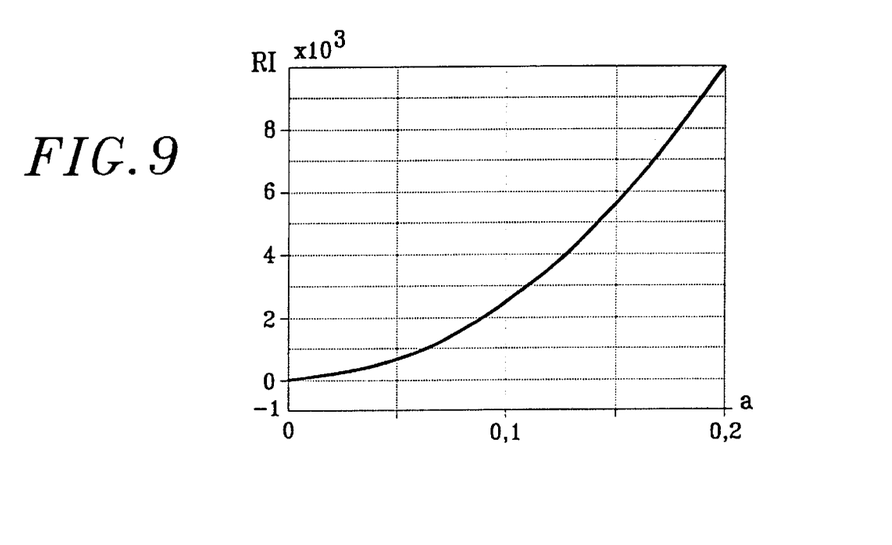
FIG. 9 shows the ratio between the intensity of the central mode and the intensity of the first two lateral modes as a function of the modulation amplitude.

FIG. 9 shows the intensity ratio (RI) between the central mode and the first two lateral modes as a function of the modulation amplitude $\underline{a}$. This ratio is defined by the quantity $[J_1(a)/J_0(a)]^2$ where $J_1()$ and $J_0()$ are Bessel functions of the order of 1 and 0, and $\underline{a}$ is the modulation amplitude. This figure shows that the modulation rate must be low, more precisely less than or equal to 0.1 (in reduced unit). Note that at low modulation rates, the intensity of the other modes becomes negligible ($1.5 \times 10^6$ times less than order 0).

Figure 10A:
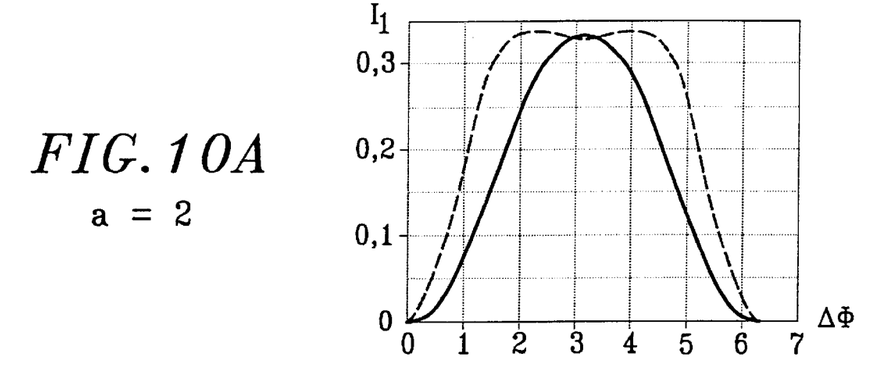
FIGS. 10A, 10B and 10C show the variations of the intensity of the first mode as a function of the phase shift for different modulation amplitudes; for 10A the modulation amplitude is equal to 2; for 10B the amplitude is equal to 0.8; for 10C the amplitude is equal to 0.1.
Figure 10B:
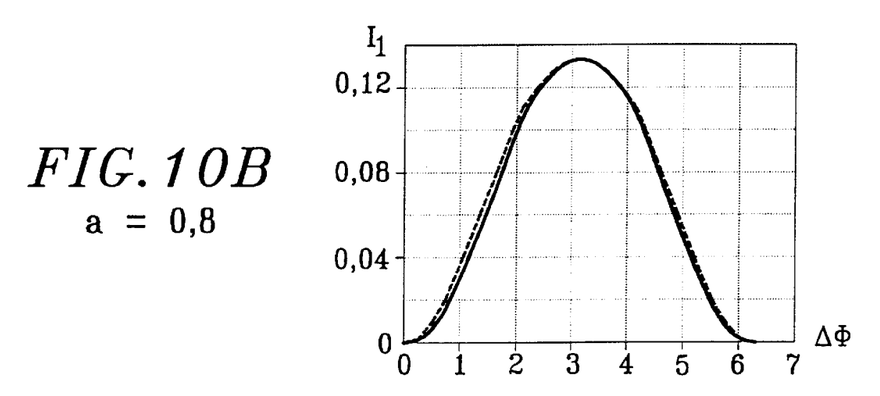
Figure 10C:
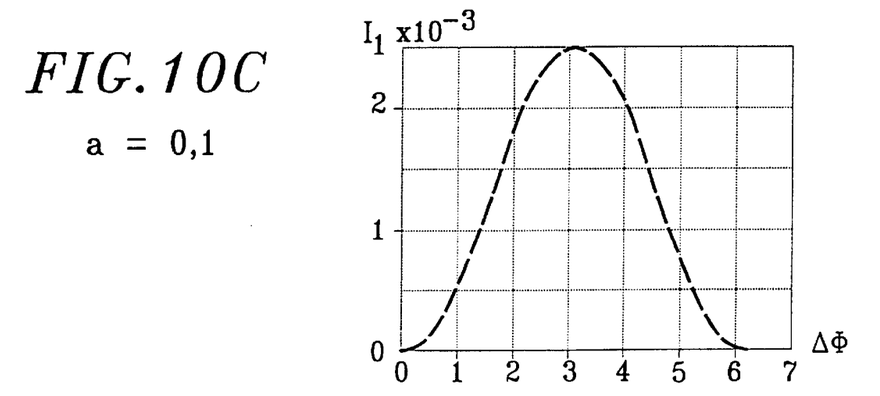

A search can be made to determine from which modulation amplitude a modulation of the form $(1-\cos \Delta\phi)$ is obtained. This is done by varying the phase shift $\Delta\phi$, and observing how the intensity of the first mode varies as a function of phase shift for a given amplitude and comparing it with the curve $1-\cos \Delta\phi$. This is shown in FIGS. 10A, 10B and 10C. This curve shows the variations in the intensity of the first mode I1 (shown as a dashed line) as a function of the phase shift $\Delta\phi$ for modulation amplitudes $\underline{a}$ equal to 2, 0.8 and 0.1 respectively. FIGS. 10A, 10B and 10C also show the curve $(1-\cos \phi)$ as a solid line.

Comparing the curve $(1-\cos \Delta\phi)$ and the intensity variations as a function of the phase shift, it can be seen that there is good agreement for a modulation ratio of 0.1. Therefore, the device can be used for cryptographic purposes.

Figure 11A:
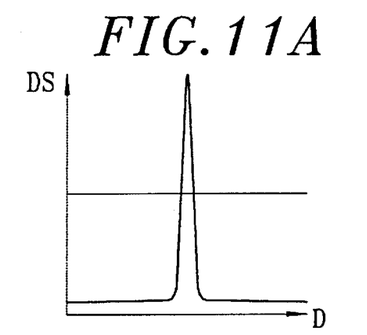
FIGS. 11A, 11B and 11C show the spectral density observed at the output from the Fabry-Pérot, with a phase shift of 0, $\pi/2$ and $\pi$ respectively.
Figure 11B:
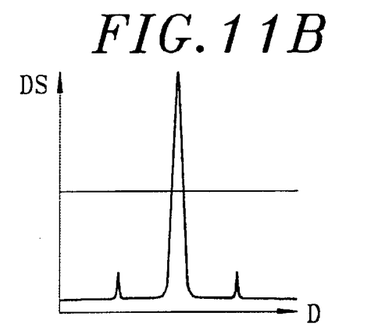
Figure 11C:
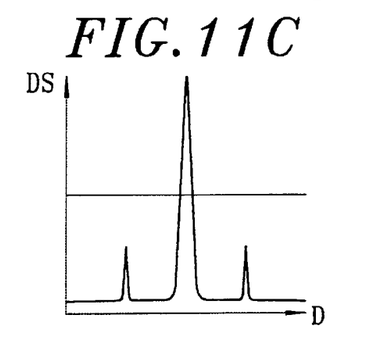
Figure 11D:
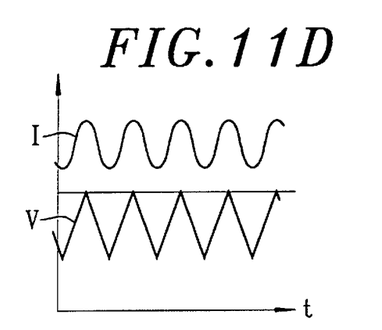
FIGS. 11D, 11E, 11F, 11G, 11H show the control voltages (at the bottom) and the intensity variations (at the top) of the first modulation mode selected by the Fabry-Pérot as a function of the phase shift (11D phase shift from 0 to π) (11E and 11F phase shift close to π/4) (11G, 11H the phase shift can be one of the two values 0 and π/2).
Figure 11E:
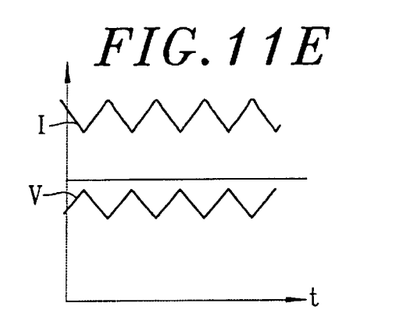
Figure 11F:
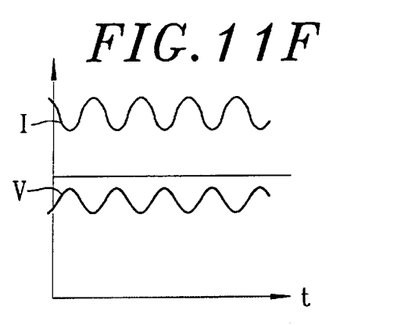

FIGS. 11A to 11H contain some results obtained in different configurations:

FIGS. 11A, 11B, 11C: spectral density DS observed at the output from the Fabry-Pérot 322 with a phase shift $\phi$ of 0, $\pi/2$ and $\pi$ respectively between the control signal for the two modulators 304 and 322, FIGS. 11D, 11E, 11F, 11G, 11H; for the lower signals—control voltage V causing a variation in the phase shift between the control signals of the two modulators; upper signals—intensity variation I for the first modulation mode selected by the Fabry-Pérot corresponding to the phase shift;

FIG. 11D; the phase shift varies continuously and linearly from 0 to $\pi$,

FIGS. 11E and 11F; the phase shift varies continuously but slightly around $\pi/4$; linearly (11E) and siniusoidally (11F).

Figure 11G:
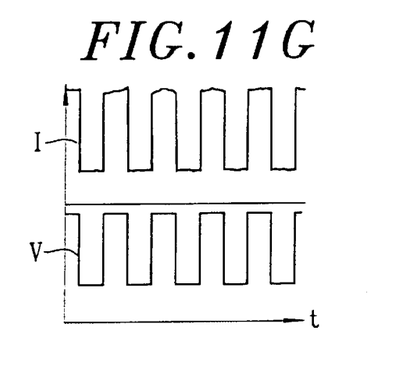
Figure 11H:
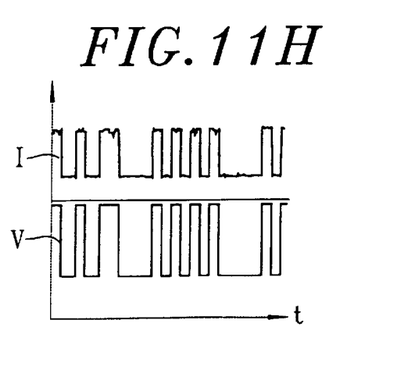

FIGS. 11G et 11H: the phase shift varies on the two states 0 and $\pi/2$: 11G periodic signal, 11H non periodic signal.

Note that several parallel devices like those described previously may be used together, powered by optical sources with different waves lengths to transmit several encryption keys simultaneously using the known wave length multiplexing technique.

On reception, dermultiplexing takes place using several spectrum analyzers (250,322) in parallel to separate the different wave lengths on which each encryption key is encoded.

What is claimed as new and desired to be secured by Letters Patent of the United States is:

1. A method of performing quantum encryption key distribution, the method comprising:
 a) emitting a sequence of photons by choosing one of two determined states at random for each photon by a sender, each photon forming a code for one information bit, the emitting step including:
  generating a light beam with a given angular frequency and a given intensity,
  producing a first electrical modulation signal having a first phase chosen at random from two values, the code for each of the bits being determined by the first phase,
  modulating the light beam by the first electrical signal, the modulated light beam exhibiting a central mode and at least two lateral modes, and
  attenuating intensity of the light beam such that the intensity of the lateral modes is sufficiently low to yield only one photon in the lateral modes, wherein the photons associated with the information bits forming the encryption key are the photons transmitted in the two lateral modes and not in the central mode;
 b) detecting the photons by choosing, one out of two determined measurement bases at random by an addressee, the detecting step including:
  producing a second electrical modulation signal synchronous with the first electrical modulation signal, the second electrical modulation signal having a second phase chosen at random from two predetermined values that are different from the two values chosen for the first phase,
  modulating the received light beam by the second electrical signal,
  optically separating the received central mode and the lateral modes, and
  detecting, in one of the lateral modes, presence of a photon based upon a phase difference between the first phase chosen by the sender and the second phase chosen by the addressee; and
 c) informing the sender which photons the addressee detected through a public channel, without revealing the values of the second phase used by the addressee, the sender and the addressee retain the bits for which photons were detected to form the encryption key.

2. The method according to claim 1, wherein the modulating steps are based upon at least one of amplitude modulation and frequency modulation with a predetermined modulation ratio.

3. The method according to claim 2, wherein the modulation ratio is less than 0.5.

4. The method according to claim 3, wherein the modulation ratio is 0.1.

5. A quantum encryption key distribution system, comprising:
 a) a sending device for emitting a sequence of photons by choosing one of two determined states at random for each photon, each photon forming a code for one information bit, the sending device including:
  means for generating a light beam with a given angular frequency and a given intensity,
  means for producing a first electrical modulation signal having a first phase chosen at random from two determined values, the code of each of the bits being determined by this first phase,
  means for modulating the light beam by this first electrical signal, the modulated light beam exhibiting a central mode and at least two lateral modes, and
  a light beam intensity attenuating means for reducing the intensity of the lateral modes sufficiently low to yield only a single photon in the lateral modes, wherein the photons associated with the information bits forming the encryption key are the photons transmitted in the lateral modes and not in the central mode; and b) a receiving device for detecting the photons by choosing one out of two determined measurement bases, the receiving device including:

means for producing a second electrical modulation signal synchronous with the first electrical modulation signal, the second electrical modulation signal having a second phase chosen at random from two predetermined values that are different from the two determined values chosen for the first phase, means for modulating the light beam received by the second electrical signal, an analyzer means for optically separating the received central mode and the lateral modes, a photodetector means for receiving one of the lateral modes and for outputting a signal based upon a phase difference between the first phase chosen by the sender and the second phase chosen by the addressee, and means for informing the sending device which photons were detected through a public channel, without revealing the values of the second phase used.

6. A system according to claim 5, wherein the means for generating the light beam is a semiconductor laser.

7. A system according to claim 5, further comprising means for multiple distribution of encryption keys using a wavelength multiplexing means.

8. A method of performing quantum encryption key distribution, the method comprising:

a) emitting a sequence of photons based upon a randomly selected predetermined state for each photon by a sender, each photon forming a code for one information bit, the emitting step including:

generating a light beam with a given angular frequency and a given intensity, producing a first electrical modulation signal having a first phase that is randomly selected, the code for each of the bits being determined by the first phase, modulating the light beam by the first electrical signal, the modulated light beam exhibiting a central mode and a plurality of lateral modes, and attenuating intensity of the light beam such that the intensity of the lateral modes is sufficiently low to yield only one photon in the lateral modes, wherein the photons associated with the information bits forming the encryption key are the photons transmitted in the lateral modes and not in the central mode;

b) detecting the photons based upon a randomly selected predetermined measurement base by an addressee, the detecting step including:

producing a second electrical modulation signal synchronous with the first electrical modulation signal, the second electrical modulation signal having a second phase that is randomly selected, modulating the received light beam by the second electrical signal, optically separating the received central mode and the lateral modes, and detecting, in one of the lateral modes, presence of a photon based upon a phase difference between the first phase and the second phase; and c) informing the sender which photons the addressee detected through a public channel, without revealing the values of the second phase used by the addressee, the sender and the addressee retain the bits for which photons were detected to form the encryption key.

9. The method according to claim 8, wherein the modulating steps are based upon at least one of amplitude modulation and frequency modulation with a predetermined modulation ratio.

10. The method according to claim 9, wherein the modulation ratio is less than 0.50.

11. The method according to claim 10, wherein the modulation ratio is 0.10.

* * * * *